United States Patent
Rahme et al.

(10) Patent No.: US 12,003,491 B2
(45) Date of Patent: Jun. 4, 2024

(54) METHOD AND SYSTEM FOR ASYNCHRONOUS MEDICAL PATIENT DATA COMMUNICATION BETWEEN MULTIPLE PARTIES

(71) Applicant: Authentic, Inc., Bingham Farms, MI (US)

(72) Inventors: Kamil Rahme, Bingham Farms, MI (US); Jeffrey Santoso, Bingham Farms, MI (US); Lauren Brown, Bingham Farms, MI (US); Jorey Chernett, Bingham Farms, MI (US)

(73) Assignee: AUTHENTIC, INC., Bingham Farms, MI (US)

( * ) Notice: Subject to any disclaimer, the term of this patent is extended or adjusted under 35 U.S.C. 154(b) by 0 days.

(21) Appl. No.: 18/102,450

(22) Filed: Jan. 27, 2023

(65) Prior Publication Data

US 2023/0171232 A1     Jun. 1, 2023

Related U.S. Application Data

(63) Continuation-in-part of application No. 17/942,054, filed on Sep. 9, 2022.

(60) Provisional application No. 63/278,960, filed on Nov. 12, 2021.

(51) Int. Cl.
*H04L 9/40* (2022.01)
*G06Q 50/18* (2012.01)

(52) U.S. Cl.
CPC ......... *H04L 63/0428* (2013.01); *G06Q 50/18* (2013.01); *H04L 63/0853* (2013.01)

(58) Field of Classification Search
CPC .. H04L 63/0428; H04L 63/0853; G06Q 50/18
See application file for complete search history.

(56) References Cited

U.S. PATENT DOCUMENTS 10,790,056 B1 *  9/2020  Accomazzi ......... H04L 67/1097
2003/0046587 A1  3/2003  Bheemarasetti et al.
(Continued)

OTHER PUBLICATIONS

Elvas, Luis B et al. "Sharing Health Information Using a Blockchain." Healthcare (Basel, Switzerland) vol. 11,2 170. Jan. 5, 2023 (Year: 2023).*

(Continued)

*Primary Examiner* — Michael R Vaughan
(74) *Attorney, Agent, or Firm* — Dickinson Wright PLLC

(57) ABSTRACT

Systems and methods for managing a document request, the method comprising receiving, from a first healthcare entity, at least one medical document associated with a patient at a server. The method further comprising receiving, from a second healthcare entity, a medical document request where the medical document request may be directed to one of an image, a financial statement, a prescription, a referral to healthcare entity, or a report. The method further comprising determining, based on the document request, whether a legal document is required to approve the request. The method further comprising, sending, in response to the request requiring approval from a legal entity, to a legal entity associated with the patient a legal document request related to the medical document request.

20 Claims, 13 Drawing Sheets

(56) References Cited

U.S. PATENT DOCUMENTS

| | | | |
|---|---|---|---|
| 2011/0015941 A1* | 1/2011 | Backhaus | G16H 30/40 |
| | | | 705/2 |
| 2011/0145693 A1 | 6/2011 | Mutic et al. | |
| 2015/0178449 A1* | 6/2015 | Ferry | G16H 10/60 |
| | | | 705/3 |
| 2016/0210408 A1 | 7/2016 | Yu et al. | |
| 2016/0277374 A1* | 9/2016 | Reid | H04L 63/0435 |
| 2018/0322946 A1* | 11/2018 | Ika | G06F 21/6254 |
| 2020/0036663 A1* | 1/2020 | Pickens | H04L 51/046 |
| 2020/0137097 A1 | 4/2020 | Zimmermann et al. | |
| 2020/0161003 A1 | 5/2020 | Wright et al. | |
| 2021/0057064 A1 | 2/2021 | Ballard et al. | |
| 2021/0151147 A1 | 5/2021 | Dempers et al. | |
| 2021/0158931 A1* | 5/2021 | Tweedie | H04L 67/12 |
| 2021/0256615 A1* | 8/2021 | Hayward | G06V 30/194 |

OTHER PUBLICATIONS

International Search Report and Written Opinion of the International Search Authority for International Application No. PCT/US22/43152 dated Jan. 3, 2023, 6 pages.

International Search Report from PCT/US23/29393 dated Dec. 8, 2023.

* cited by examiner

Pay For Work-Order                                                    ✕

Manually Pay For Work-Order Entry With The Following Detail:
Type:              Auto GL
Request Type:      Subpoena  ～1302
File Number:       A0092
Patient File Name: A0092-001
Custodian:         Custodian

/1304

| Items | Items Total | Price |
|---|---|---|
| Radiology Report | 1 | $0.25 |
| Images | 2 | $100 |
| Processing Fee | 1 | $35 |
| Search Fee | 1 | $20 |
| Merchant Fee | 1 | $5.82 |
| | Total | $161.07 |

Please Select Your Payment Source:  /1306
○ One-Time Credit Card Payment
◉ Bank Account (STRIPE TEST BANK, Account Number Ending With 6789)

[Pay For This Entry]

FIG. 13

METHOD AND SYSTEM FOR ASYNCHRONOUS MEDICAL PATIENT DATA COMMUNICATION BETWEEN MULTIPLE PARTIES

CROSS-REFERENCES TO RELATED APPLICATION

This patent application is a continuation-in-part application of U.S. Non-Provisional patent application Ser. No. 17/942,054, filed Sep. 9, 2022, which claims the benefit and priority to U.S. Provisional Patent Application Ser. No. 63/278,960, filed Nov. 12, 2021, the entire disclosures of these documents are incorporated herein by reference.

FIELD OF THE DISCLOSURE

The present disclosure relates to an asynchronous medical patient data communication and management system. More particularly, the system of the present disclosure facilitates the secure communication of patient document files between healthcare providers with distinct internal IT networks.

BACKGROUND OF THE DISCLOSURE

This section provides background information related to the present disclosure which is not necessarily prior art.

Hospital systems must manage large troves of sensitive user data. Such data has unique security regulations that lead to cumbersome security protocols. The data typically must be accessible by various individuals within a particular health care institution's internal network, such as doctors and staff. The data often must also be shareable with other parties, such as medical laboratories, clinics, and other health care systems. The increased security protocols, huge amount of data, and large number of people that must access the data leads to unique challenges faced by large healthcare institutions.

Often health care providers are required to share patient data in order to serve the patient. For example, scans of the patient (e.g., X-ray, MRI, CAT) are commonly analyzed by radiologists working off-site for a different healthcare entity. Without a secure means for transferring the data quickly, healthcare outcomes may suffer.

Hospitals are correctly cautious in granting full access to their internal database to external healthcare entities. Often access is limited to protect the privacy of patient information stored by the hospital. In order to grant access, hospitals often require paperwork to be filed, and associated review and granting of permission by hospital personnel.

Another concern that requires high data security is a need to comply with all current and future health care IT laws (such as HIPAA). HIPAA requires that hospitals limit access to their IT to authorized employees only. Sharing of health data between health care entities requires authentication between the systems. Violation of HIPAA policies can lead to considerable civil penalties.

Hospitals have attempted to utilize physical storage as a means of data exchange. Such means include a CD-ROM or portable memory device. In this instance, relevant data is loaded on the device and delivered to another health care entity. Such a transfer avoids granting remote access to patient data at all. However, this approach is very time consuming and dependent on mail services. The increasing size of data files is another concern, as physical media is generally not intended to transfer the scale of data required for high resolution 3D images.

In order to set up a secure connection between to health care providers, the process often depends on proprietary hardware being transferred from one provider to the other. If hardware is not required, then personnel from one entity must install and authenticate the necessary permission on the client device of the opposing health care entity. Both such approaches are typically time and resource intensive in order to create the network connection.

In view of the foregoing, a method is desired that allows a health care entity to create a secure authenticated connection with another entity for the purpose of transferring patient files that only needs downloading and installing of software at the client device.

SUMMARY OF THE DISCLOSURE

This section provides a general summary of the disclosure and is not intended to be interpreted as a comprehensive listing of its full scope or of all of its objects, aspects, features and/or advantages.

In one embodiment, a method for managing a document request is disclosed. The method for receiving, from a first healthcare entity, at least one medical document associated with a patient at a server. The method further includes receiving, from a second healthcare entity, a medical document request where the medical document request may be directed to one of an image, a financial statement, a prescription, a referral to healthcare entity, or a report. The method further includes determining, based on the document request, whether a legal document is required to approve the request. The method further includes sending, in response to the request requiring approval from a legal entity, to a legal entity associated with the patient a legal document request related to the medical document request.

In one embodiment, a non-transitory computer-readable storage medium is disclosed. The computer-readable medium includes receiving, from a first healthcare entity, at least one medical document associated with a patient at a server. The computer-readable medium further includes receiving, from a second healthcare entity, a medical document request where the medical document request may be directed to one of an image, a financial statement, a prescription, a referral to healthcare entity, or a report. The computer-readable medium further includes determining, based on the document request, whether a legal document is required to approve the request. The computer-readable medium further includes sending, in response to the request requiring approval from a legal entity, to a legal entity associated with the patient a legal document request related to the medical document request.

In one embodiment, a device having a processor and a non-transitory computer-readable medium encoded with instructions is disclosed. The system includes receiving, from a first healthcare entity, at least one medical document associated with a patient at a server. The system further includes receiving, from a second healthcare entity, a medical document request where the medical document request may be directed to one of an image, a financial statement, a prescription, a referral to healthcare entity, or a report. The system further includes determining, based on the document request, whether a legal document is required to approve the request. The system further includes sending, in response to the request requiring approval from a legal entity, to a legal entity associated with the patient a legal document request related to the medical document request.

Another aspect may include receiving, from the legal entity, a legal document associated with the legal document request, generating, in response to the legal document fulfilling the legal document request, a work order associated with the medical document request, and sending the work order to the first healthcare entity. Another aspect may include receiving, from the first healthcare entity, in response to the work order, the medical document and sending, to the second healthcare entity, the medical document and the legal document. Another aspect may include a payment associated with the work order is calculated based on the number of medical documents requested and a type of medical documents requested.

Another aspect may include a medical document request may further include a date of ailment and a location of ailment. Another aspect may include a legal staff associated with the legal entity may respond to legal document requests. Another aspect may include a legal document being one of an authorization document, a letter of representation document, and a subpoena document. Another aspect may include the legal entity being authorized by the patient, where authorization occurs when an authorization document citing the legal entity is signed by the patient and received by the server. Another aspect may include the document request further comprising a name of a patient and a patient identification information, a request type, a request unique identifier, a patient insurance claim identifier, and a healthcare professional associated with the patient.

Other technical features may be readily apparent to one skilled in the art from the following figures, descriptions, and claims.

DRAWINGS

The drawings described herein are for illustrative purposes only of selected embodiments and not all possible implementations thereof such that the drawings are not intended to limit the scope of the present disclosure.

Figure 5:
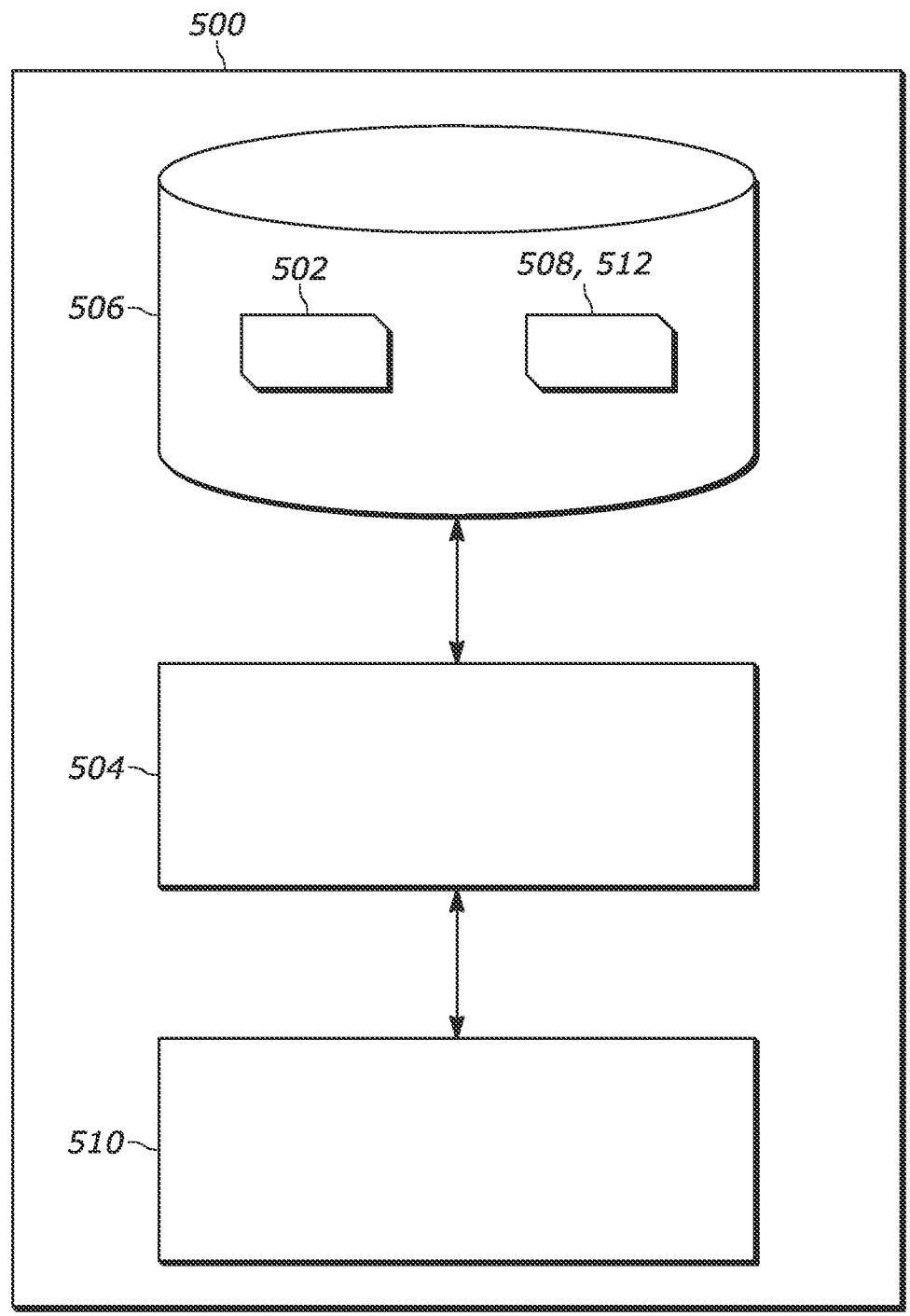

FIG. 5 generally illustrates a system for training a neural network, according to the principles of the present disclosure.

Figure 6:
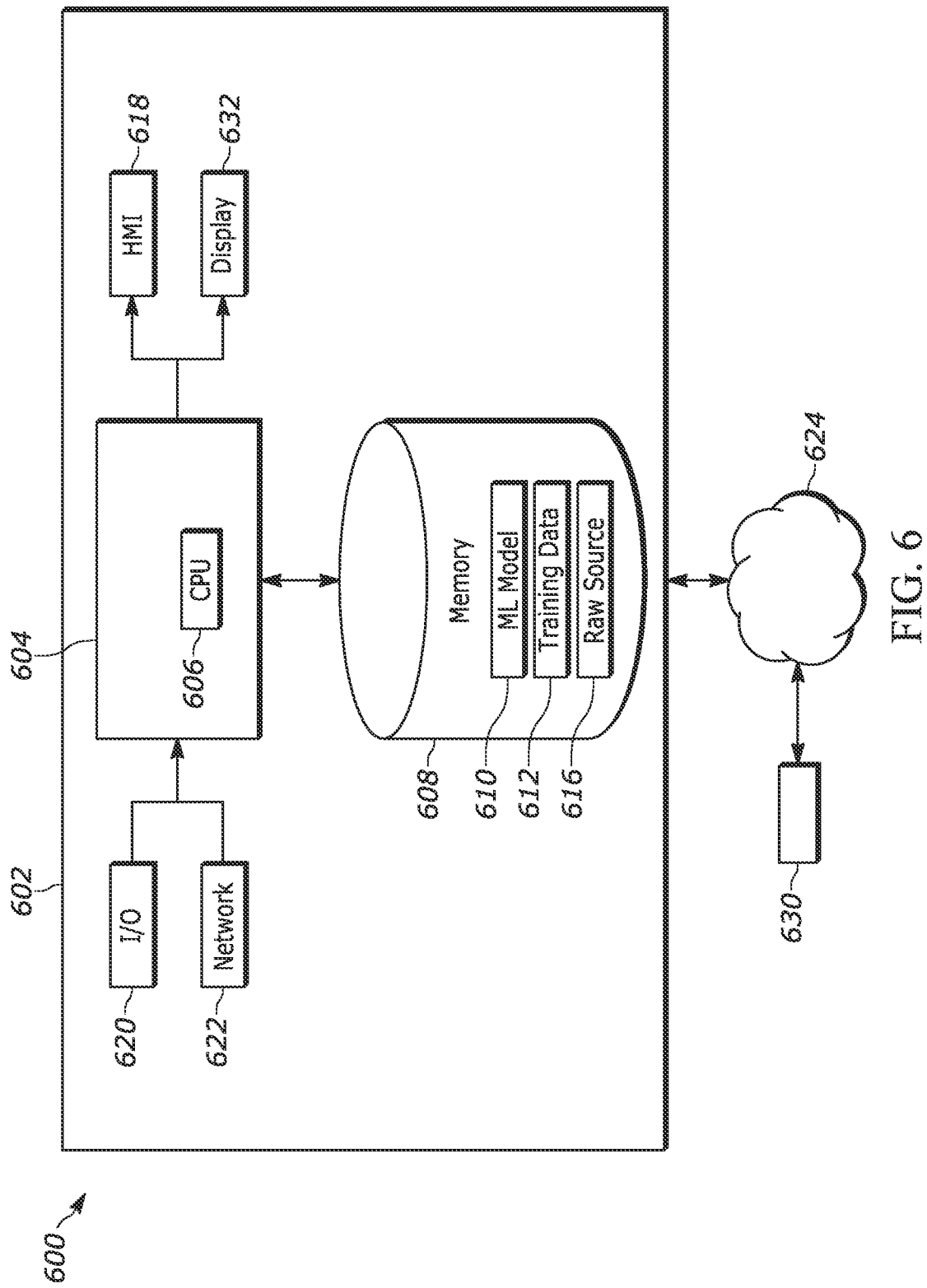

FIG. 6 generally illustrates a computer-implemented method for training and utilizing a neural network, according to the principles of the present disclosure.

Figure 7:
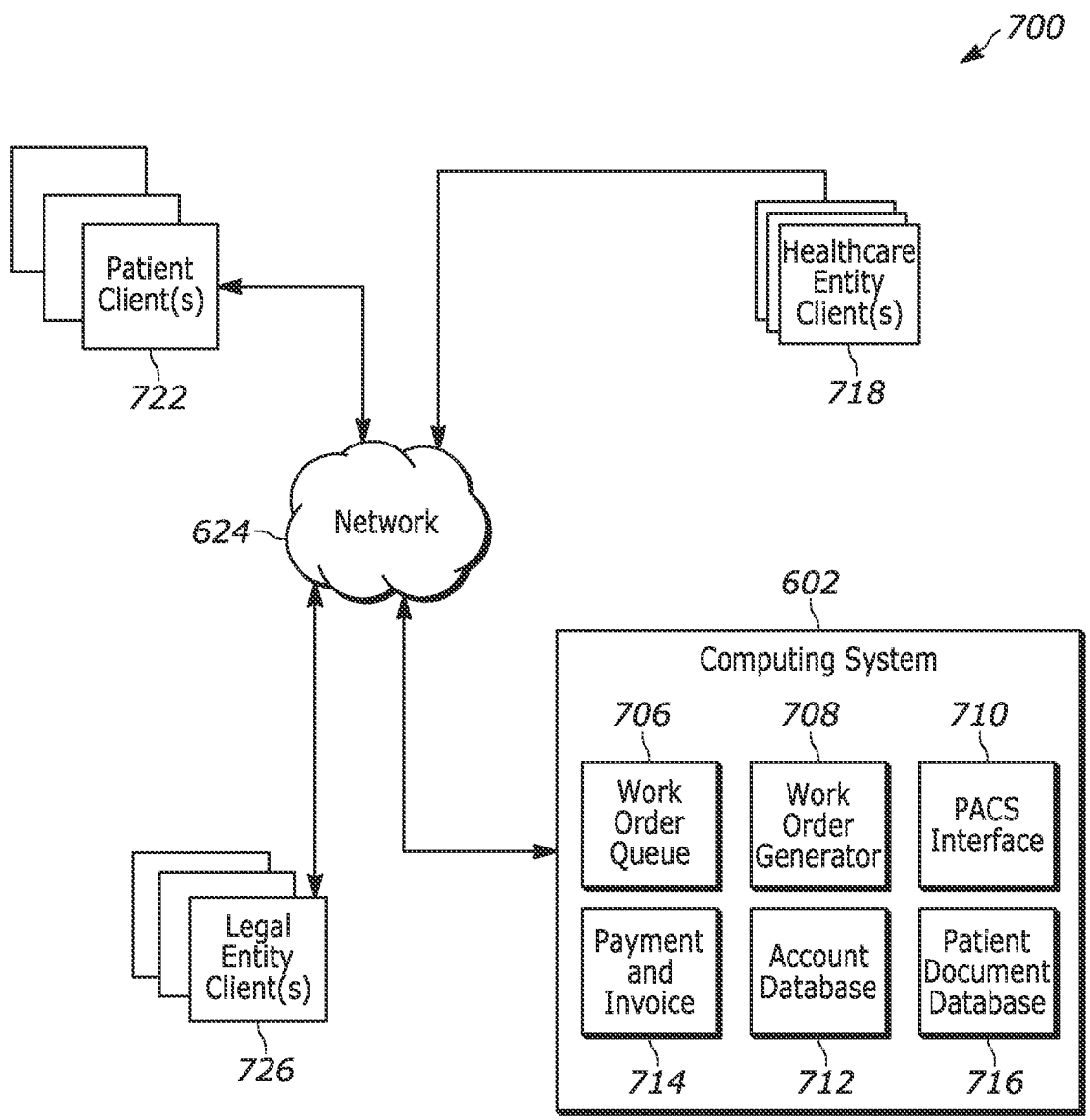

FIG. 7 is a block diagram of an example computing environment of client devices from multiple parties, in accordance with some implementations of the present disclosure.

Figure 8:
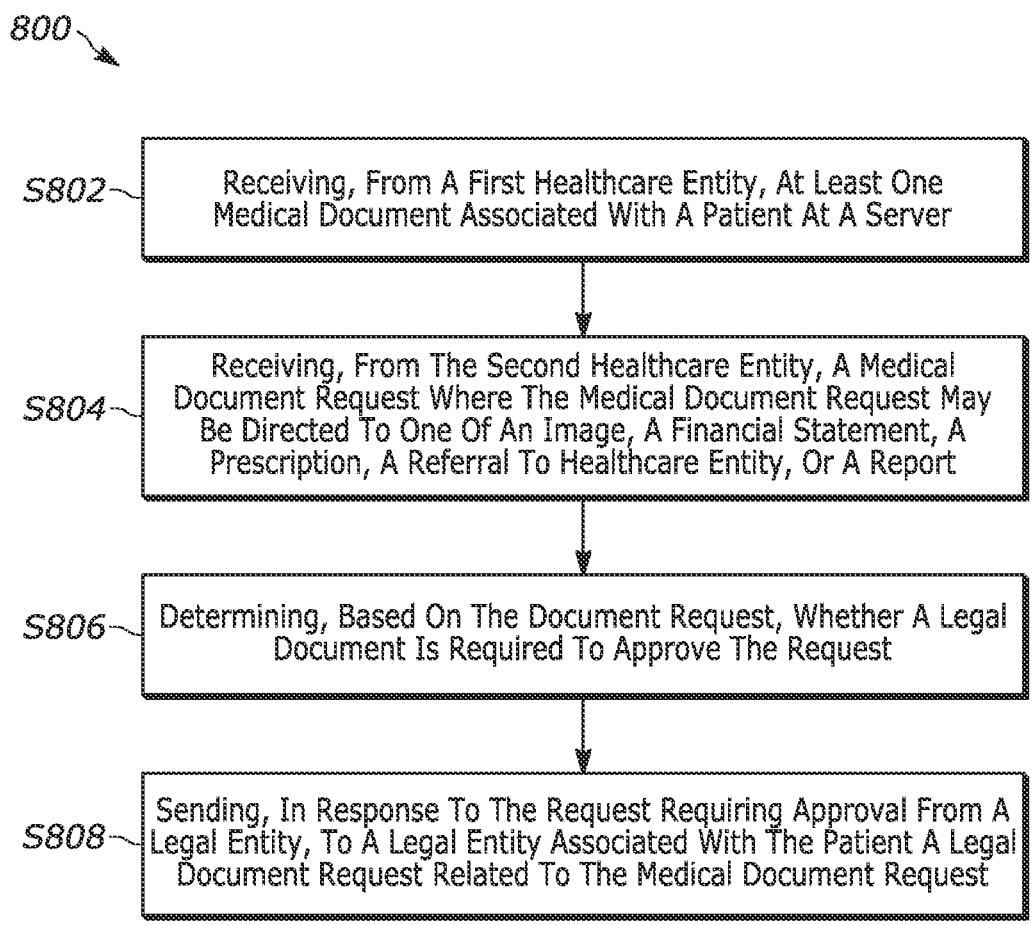

FIG. 8 is a flow chart of an example process for initiating a document transfer, involving multiple parties, in accordance with some implementations of the present disclosure.

Figure 9:
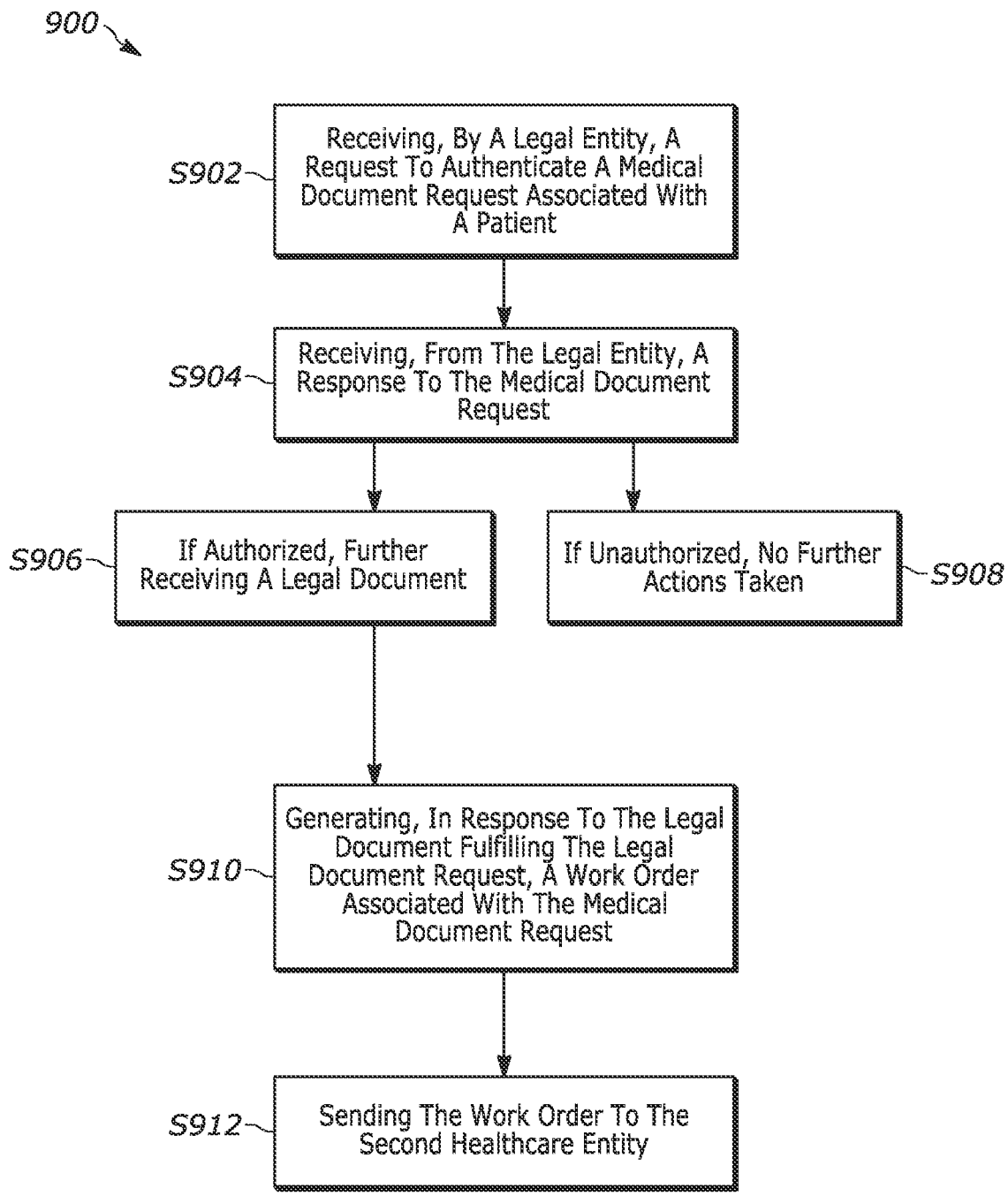

FIG. 9 is a flow chart of an example process for authorizing a document transfer on behalf of a legal client, in accordance with some implementations of the present disclosure.

Figure 10:
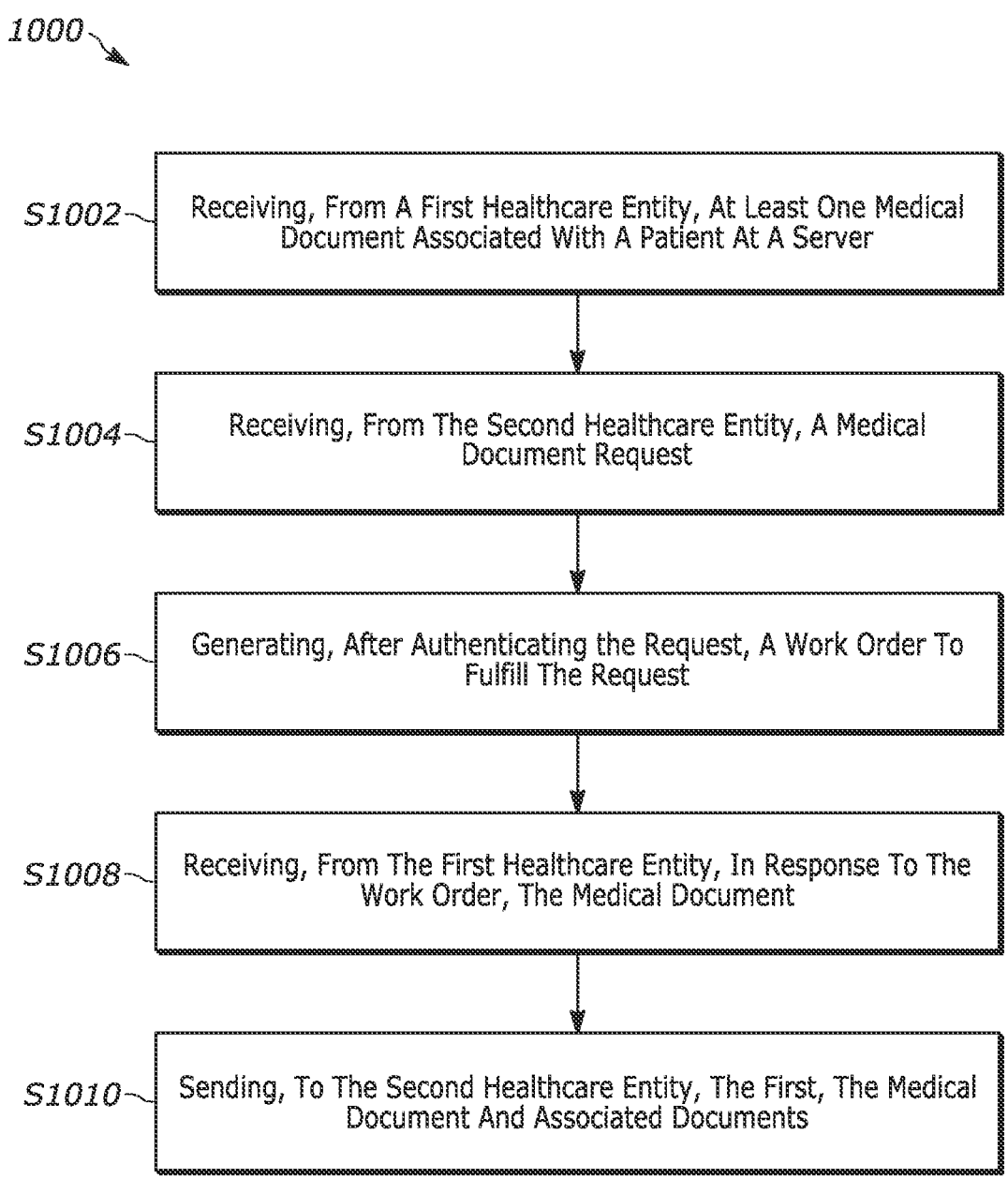

FIG. 10 is a flow chart of an example process for completing the transfer of an authorized document, in accordance with some implementations of the present disclosure.

Figure 11:

FIG. 11 is an example user interface for initiating a document transfer request, in accordance with some implementations of the present disclosure.

Figure 12:
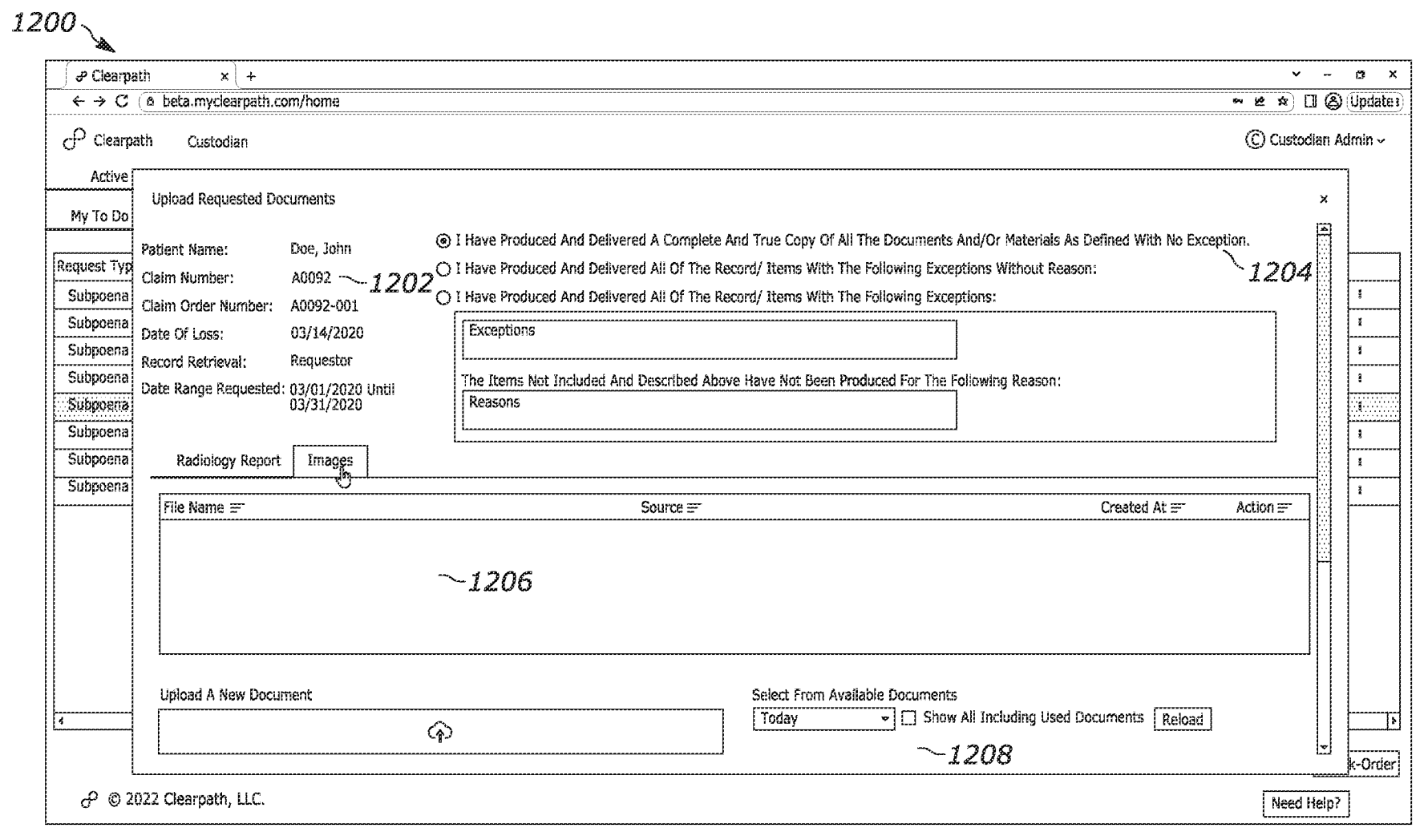

FIG. 12 is an example user interface for following up on a document transfer request, in accordance with some implementations of the present disclosure.

FIG. 13 is an example user interface for viewing an invoice related to a document transfer request, in accordance with some implementations of the present disclosure.

Corresponding reference numerals indicate corresponding parts throughout the several view of the drawings.

DETAILED DESCRIPTION OF THE EXAMPLE EMBODIMENT

Example embodiments of a patient document management system embodying the teachings of the present disclosure will now be described more fully with reference to the accompanying drawings. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiments may be embodied in many different forms that may be combined in various ways, and that neither should be construed to limit the scope of the disclosure. In some example embodiments, well-known processes, well-known device structures, and well-known technologies are not described in detail.

Figure 1:
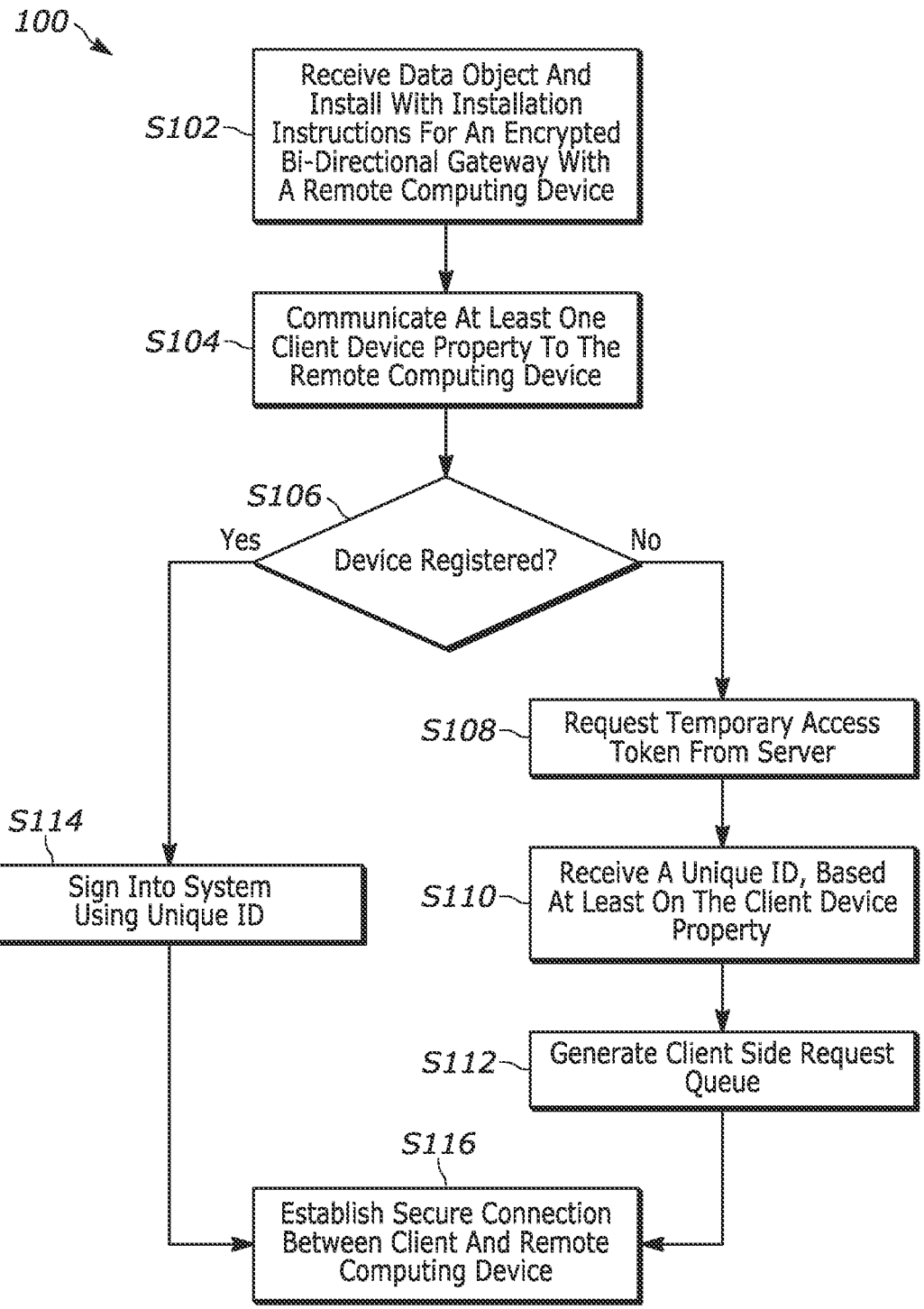
FIG. 1 is a flow chart of an example of a system for patient data management, in accordance with some implementations of the present disclosure.

FIG. 1 is a block diagram of an example of a method 100 for authenticating a device and establishing a secure connection with the remote computing device. The method 100 illustrated in FIG. 1 begins with the client device receiving a data object S102. The client device executes the instructions found in the data object which is configured to install system component on the client device. The process than moves on to S104, where the client device makes an unauthorized connection with the remote computing device. Using the unauthorized connection, the client device communicates at least one device property to the remote computing device. The remote computing device uses the received device property in order to determine if the device is already registered to the system.

If the device is not registered, the method moves on to S108, where the client device requests a temporary authentication token from the remote computing device. If the client has already attempted multiple registrations, the remote computing device refuses to provide the token. Otherwise, the remote computing device will provide an authentication token that is valid for a predetermined amount of time (e.g., 1 hour). The method then continues to S110, where the remote computing device generates a unique ID value for the client device based at least in part on the client device property received in S104. Now that the client device is fully authenticated, the system generates a client-side queue for collecting commands input by the user.

In a scenario where the system finds that the client device has been previously registered in S106, the method then moves on to S114. The system uses the unique ID value associated with the client device to fully authenticate the connection to the remote computing device in S116. The secure connection created is bidirectional and allows the transfer of secure patient data between computers over a network. Content is encrypted by a computing device before it is sent and decrypted at a computing device where it is received. In an additional scenario, at S106 an unregistered device that has already made multiple attempts to become authenticated will be denied further access to the system.

Figure 2:
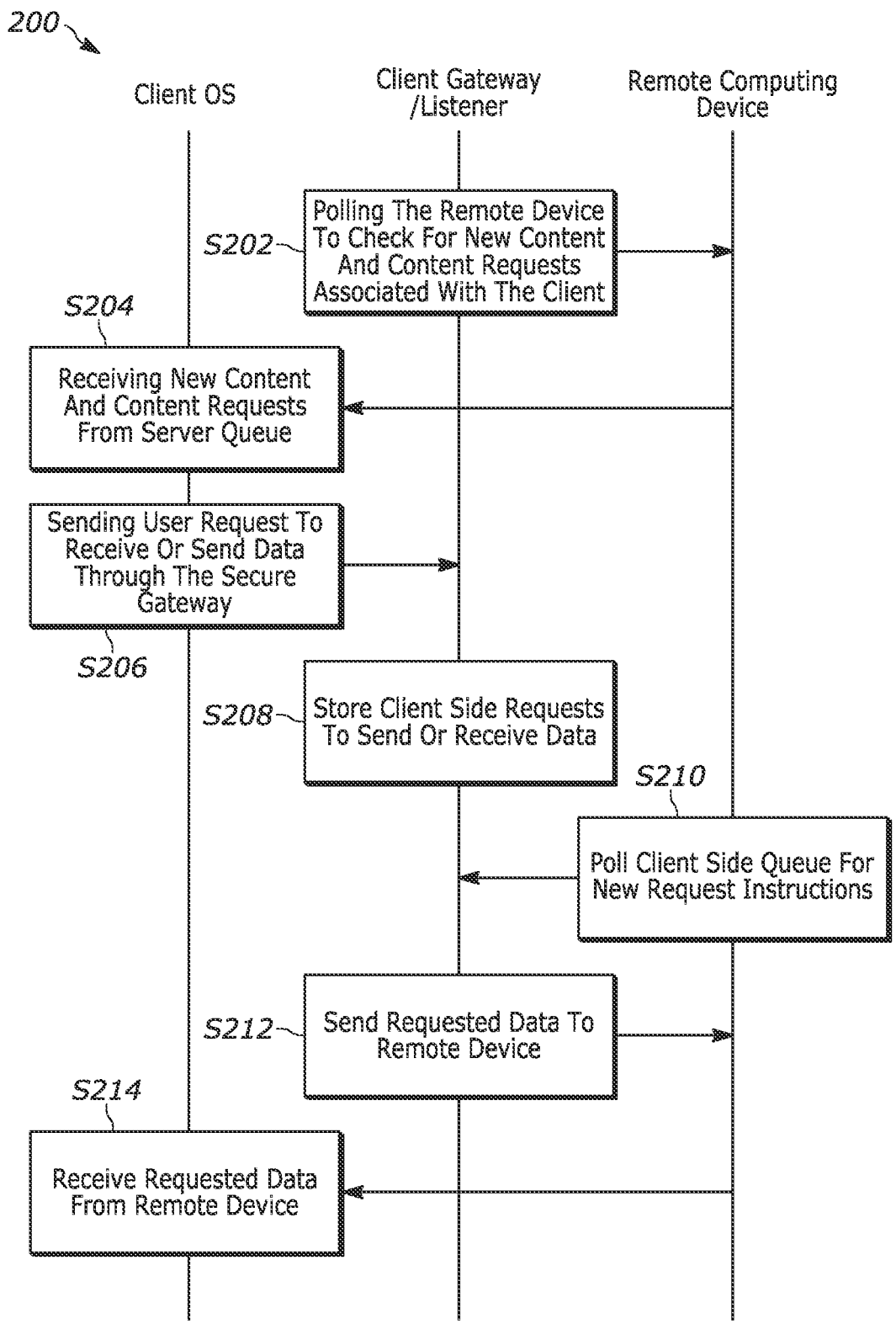
FIG. 2 is a block diagram of an example process for operating the system described in FIG. 1, in accordance with some implementations of the present disclosure.

FIG. 2 is a block diagram illustrating how the components of the system interact with one another over a network after a secure connection has been established. The components of FIG. 2 may be performed by processor 604. At S202, the client-side gateway application polls the server-side unique queue for new commands. The client receives the commands stored in the queue since the last polling request. Commands may include a command to find a specific patient file (e.g., C-Find), a command to transfer a file (e.g., C-Move), or document previously requested for receipt by the client device.

At S204, the client device receives the previously requested documents and commands that were stored in the server-side unique queue. The client regularly polls the serve-side unique queue for updates and automatically receives waiting files and executes waiting commands. At S206, a user interacting with the client device inputs a command requesting to find or move a document from the system, or otherwise interact with the system. At S208, the client device passes the commands to the client-side application which stores it in the client-side unique queue.

At S210, the remote computing device polls the client-side unique queue and receives any new commands entered by users on the client device. At S212, the client computing device sends and receives the patient documents based on the commands stored in the unique client-side queue. Finally, at S214, the client computing device receives the documents requested by the commands stored in the unique client-side queue.

Figure 3:
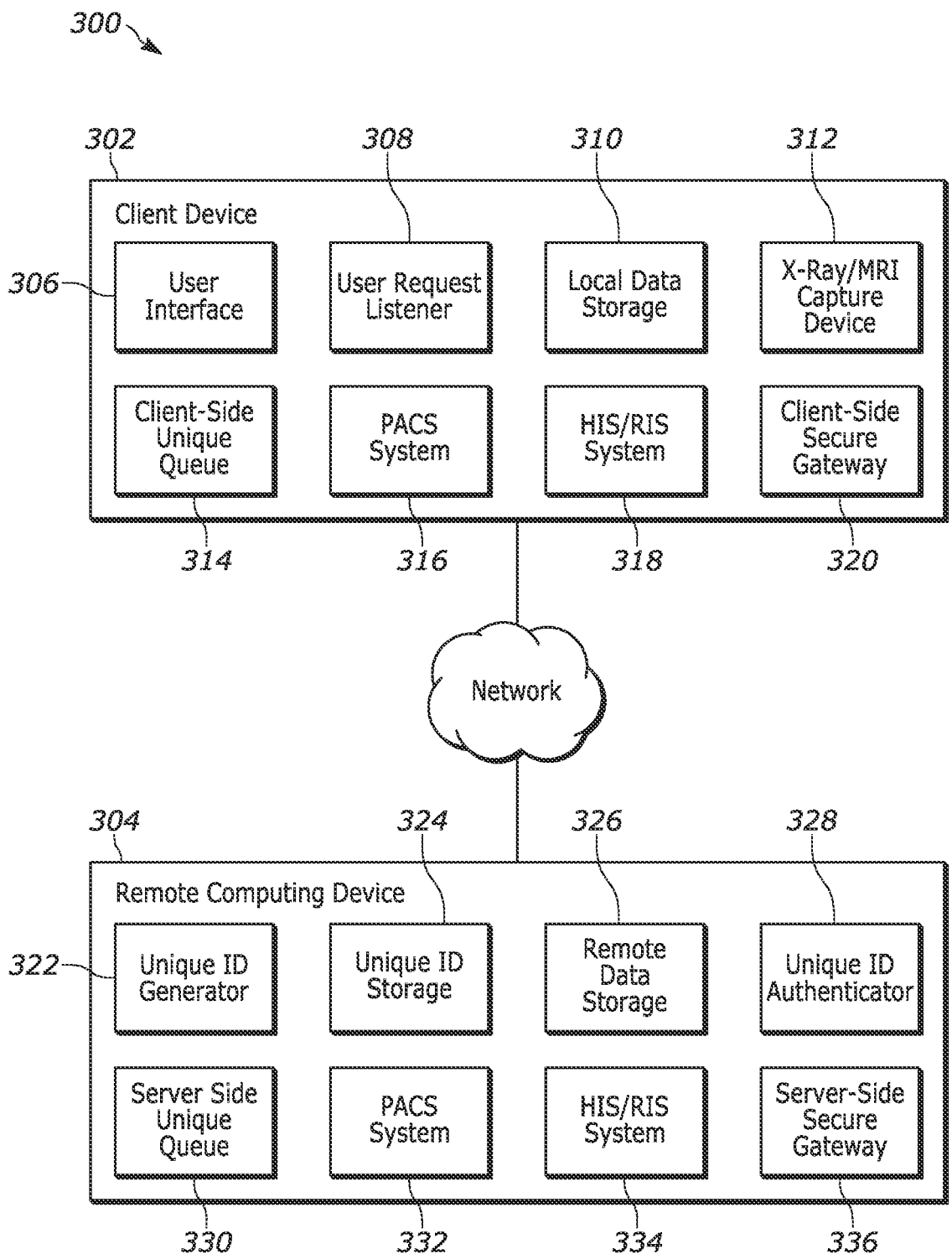
FIG. 3 is a block diagram of an example of system devices and their components, in accordance with some implementations of the present disclosure.

FIG. 3 is a component view, specifically of the client computing device 302 and the remote computing device 304. The client device is a computer having at least a processor and running an operating system (e.g., MS WINDOWS, APPLE OSX, CHROME OS, ANDROID, LINUX, APPLE iOS). The components of FIG. 3 may be performed by processor 604. The client computing device 302 includes user interface 306 which allows a user to input commands. The user interface 306 is based on mouse and keyboard inputs, touch based inputs, or any other applicable user interface input method. The user interface 306 allows the user to interact with documents stored on the system which have already been authenticated and received from a 3$^{rd}$ party. The user interface 306 further allows the user to make requests for documents related to a user. The recipient receives the request determines what documents are available related to the request, the recipient selects records of the documents and sends them back to the user. The user then may choose from among the records which documents they are requesting. The recipient may then send the requested documents to the user. When a user inputs a command, the user request listener 308 will recognize the command is intended for the system and stores the command in the client-side unique queue 314.

The client-side unique queue 314 will continue to store new command inputs from the user, a hospital utilizing a PACS system 316 to transfer DICOM images and store commands such as C-Move, and C-Find. A PACS system 316 (picture archiving and communication system) is a medical imaging platform which provides storage and access to patient documents from multiple client devices. Patient files stored by PACS are stored in a format called DICOM (digital imaging and communications in medicine). The overarching administrative tool used to manage that facilitates the intercommunication of these services is the HIS/RIS 318, (hospital information system/radiology information system).

The DICOM images are generated by a scanning modality such as an x-ray and MRI capture device 312. The patient is scanned by capture device 312 and a digital image is created in a DICOM format. The PACS system 316 stores the image in the local data storage 310 of the healthcare entity. The local data storage 310 is a non-transitory computer readable medium. When the user inputs a command to send an image from the local data storage 310 to another health care entity, that command will be stored by the client-side unique queue 314 until the queue is polled by the remote computing device 304.

When the remote computing device 304 polls the client-side unique queue 314, any commands for receiving or sending DICOM images via the PACS system 316 will be authenticated by the client-side secure gateway 320. The client-side secure gateway 320 encrypts messages before they depart and decrypts them when they arrive from the remote computing device 304.

The remote computing device 304 includes components to mirror that of the client computing device 302, such as the server-side secure gateway 336, PACS system 332, and HIS/RIS system 334. The server-side secure gateway 336 mirrors the functionality of the client-side secure gateway 320. Patient documents will be decrypted on arrival and encrypted before departure. Once received those documents are stored in the remote data storage 326 which is a non-transitory computer readable medium.

Unique to the remote computing device 304 are components associated with registration and authentication of the client computing device 302. The components include the unique ID generator 322, unique ID storage 324, and the unique ID authenticator 328. The unique ID generator 322 creates the unique ID values based on at least one component of the client computing device 302. Many components are used such as an Item Unique Identification (IUID) number, Unique Identification (UID) number or other components unique to the device 302. Unique ID storage 324 stores all the unique ID values generated by the unique ID generator 322. All devices registered to the system from all the healthcare entities subscribed to the system will have a matching unique ID stored in the unique ID storage 324. Finally, the unique ID authenticator 328 controls the process of requesting the unique ID from a registered client device and comparing it against the unique IDs stored in the unique ID storage 324. Based on that analysis, the unique ID authenticator will determine if the device being authenticated is registered. Based on that determination, the system will either allow access of begin a registration process.

Remote computing device 304 provides the cloud support for the system. All healthcare entities subscribed to the system will have their own client device 302 that facilitates communication with the remote computing device 304. Different healthcare entities communication with one another is facilitated by the remote computing device 304.

Figure 4:
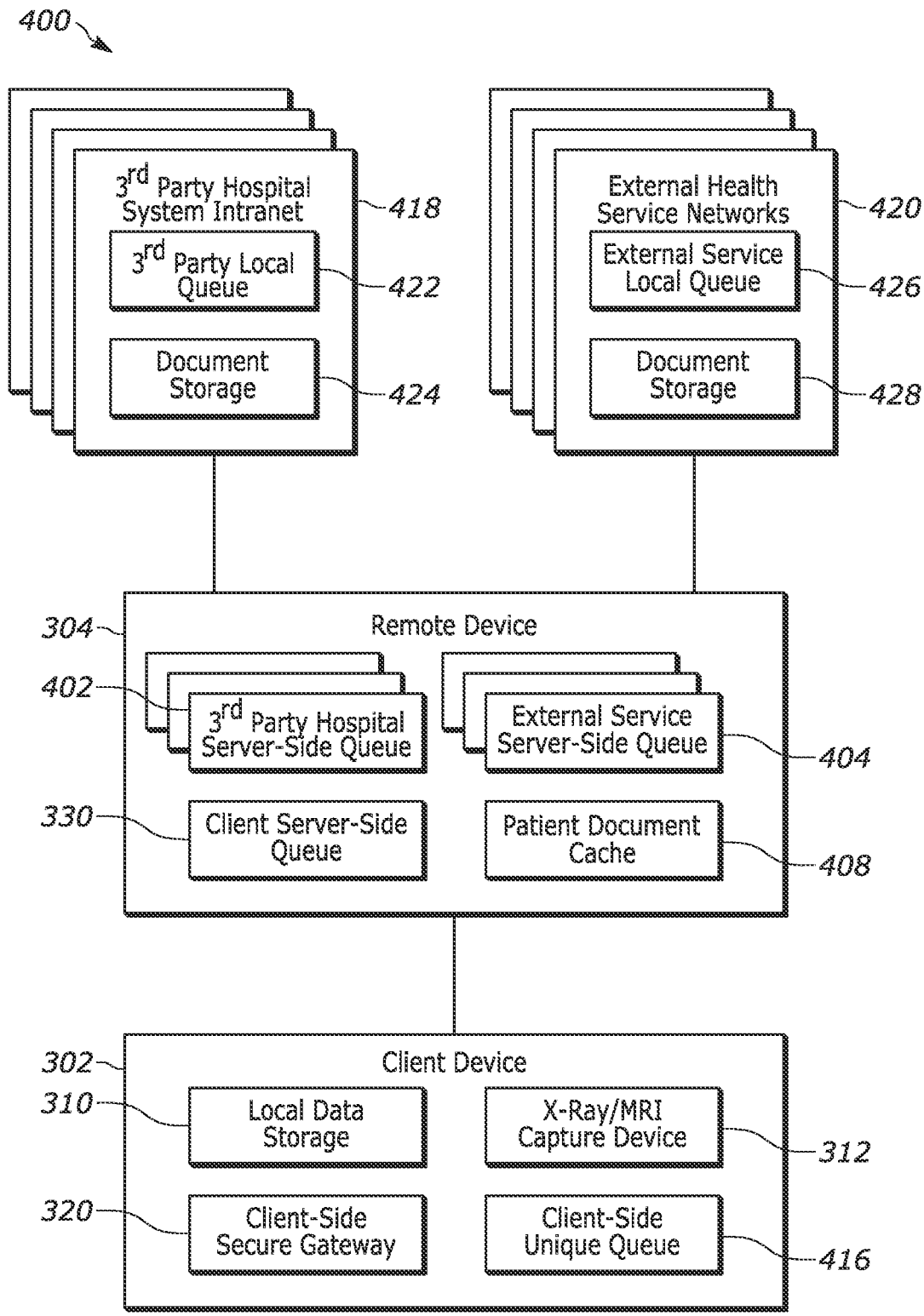
FIG. 4 is a block diagram of an example network of subscriber devices interacting with the client device, facilitated by a remote computing device of the system, in accordance with some implementation of the present disclosure.

FIG. 4 is a diagram illustrating how the system operates, not simply between the client and the remote system server 304 as in FIG. 3, with a network of subscribers all authenticated and communicatively coupled to the remote computing device 304. The components of FIG. 4 may be performed by processor 604. The remote computing device 304 facilitating all communication between subscribers of the system. From the perspective of a healthcare entity (e.g., hospital, medical clinic, etc.) access to the system is facilitated by a client computing device 302 which is already been authenticated and connected to the remote computing device 304. The healthcare entity will require transfer of documents to and from at least two groups, 3$^{rd}$ Party hospital system intranet 418 (e.g., hospitals medical clinics, hospital systems), and healthcare network 420 (i.e., medical labs, radiologist contractors, Doctors providing second opinions, insurance companies) with their own internal network.

The client-side queue 416 is unique to the healthcare entity using it. When the healthcare entity uses the client device to request or send a patient document, the command is stored in the client-side queue 416 until the client communicates them to the remote computing device 304. The commands are stored in the client server-side queue 330 that is associated with the client 302. Patient documents related to send requests are stored in the patient document cache 408. Requests to retrieve documents from a 3$^{rd}$ party hospital system will be stored in the 3$^{rd}$ party hospital server-side queue 402. Requests to retrieve documents from external health services will also be stored in the external service server-side queue 404. The documents related to the request is received by the remote computing device 304 and stored in the patient document cache 408.

The 3$^{rd}$ party hospital system intranet 418 communicates with the remote computing device 304 and polls its unique 3$^{rd}$ party hospital server-side queue. Any send or receive commands in the 3$^{rd}$ party hospital server-side queue will be sent to the 3$^{rd}$ party hospital system intranet 418 and executed by their system. Requested documents that were sent by another subscriber will be downloaded from the patient document cache 408. Requested documents will be uploaded and stored in the patient document cache with its associated command stored in the unique queue of the recipient. External health network 420 largely operates in the same manner as other subscribers but can be restricted in what they send or receive. Further, the documents sent to the external health network 420 can be set to automatically delete after a predetermined time period.

FIG. 5 shows a system 500 for training a neural network. The system 500 may comprise an input interface for accessing training data 502 for the neural network. For example, as illustrated in FIG. 5, the input interface may be constituted by a data storage interface 504 which may access the training data 502 from a data storage 506. For example, the data storage interface 504 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 506 may be an internal data storage of the system 500, such as a hard drive or SSD, but also an external data storage, e.g., a network-accessible data storage.

In some embodiments, the data storage 506 may further comprise a data representation 108 of an untrained version of the neural network which may be accessed by the system 500 from the data storage 506. It may be appreciated, however, that the training data 502 and the data representation 508 of the untrained neural network may also each be accessed from a different data storage, e.g., via a different subsystem of the data storage interface 504. Each subsystem may be of a type as is described above for the data storage interface 504.

In some embodiments, the data representation 508 of the untrained neural network may be internally generated by the system 500 on the basis of design parameters for the neural network, and therefore may not explicitly be stored on the data storage 506. The system 500 may further comprise a processor subsystem 510 which may be configured to, during operation of the system 500, provide an iterative function as a substitute for a stack of layers of the neural network to be trained. Here, respective layers of the stack of layers being substituted may have mutually shared weights and may receive as input-output of a previous layer, or for a first layer of the stack of layers, an initial activation, and a part of the input of the stack of layers.

The system 500 may further comprise an output interface for outputting a data representation 512 of the trained neural network, this data may also be referred to as trained model data. For example, as also illustrated in FIG. 5, the output interface may be constituted by the data storage interface 504, with said interface being in these embodiments an input/output ('IO') interface, via which the trained model data may be stored in the data storage 506. For example, the data representation 508 defining the 'untrained' neural network may during or after the training be replaced, at least in part by the data representation 512 of the trained neural network, in that the parameters of the neural network, such as weights, hyperparameters and other types of parameters of neural networks, may be adapted to reflect the training on the training data 502. This is also illustrated in FIG. 5 by the reference numerals 508, 512 referring to the same data record on the data storage 106. In some embodiments, the data representation 512 may be stored separately from the data representation 508 defining the 'untrained' neural network. In some embodiments, the output interface may be separate from the data storage interface 504, but may in general be of a type as described above for the data storage interface 504.

FIG. 6 a computing system 602. The computing system 602 may include at least one processor 604 that is operatively connected to a memory unit 608. The processor 604 may include one or more integrated circuits that implement the functionality of a central processing unit (CPU) 606. The CPU 606 may be a commercially available processing unit that implements an instruction stet such as one of the x86, ARM, Power, or MIPS instruction set families.

During operation, the CPU 606 may execute stored program instructions that are retrieved from the memory unit 608. The stored program instructions may include software that controls operation of the CPU 606 to perform the operation described herein. In some embodiments, the processor 604 may be a system on a chip (SoC) that integrates functionality of the CPU 606, the memory unit 608, a network interface, and input/output interfaces into a single integrated device. The computing system 602 may implement an operating system for managing various aspects of the operation.

The memory unit 608 may include volatile memory and non-volatile memory for storing instructions and data. The non-volatile memory may include solid-state memories, such as NAND flash memory, magnetic and optical storage media, or any other suitable data storage device that retains data when the computing system 602 is deactivated or loses electrical power. The volatile memory may include static and dynamic random-access memory (RAM) that stores program instructions and data. For example, the memory unit 608 may store a machine-learning model 610 or algorithm, a training dataset 612 for the machine-learning model 610, raw source dataset 616.

The computing system 602 may include a network interface device 622 that is configured to provide communication with external systems and devices. For example, the network interface device 622 may include a wired and/or wireless Ethernet interface as defined by Institute of Electrical and Electronics Engineers (IEEE) 802.11 family of standards. The network interface device 622 may include a cellular communication interface for communicating with a cellular network (e.g., 3G, 4G, 5G). The network interface device 622 may be further configured to provide a communication interface to an external network 624 or cloud.

The external network 624 may be referred to as the world-wide web or the Internet. The external network 624 may establish a standard communication protocol between computing devices. The external network 624 may allow information and data to be easily exchanged between computing devices and networks. One or more servers 630 may be in communication with the external network 624.

The computing system 602 may include an input/output (I/O) interface 620 that may be configured to provide digital and/or analog inputs and outputs. The I/O interface 620 may include additional serial interfaces for communicating with external devices (e.g., Universal Serial Bus (USB) interface).

The computing system 602 may include a human-machine interface (HMI) device 618 that may include any device that enables the system 600 to receive control input. Examples of input devices may include human interface inputs such as keyboards, mice, touchscreens, voice input devices, and other similar devices. The computing system 602 may include a display device 632. The computing system 602 may include hardware and software for outputting graphics and text information to the display device 632. The display device 632 may include an electronic display screen, projector, printer or other suitable device for displaying information to a user or operator. The computing system 602 may be further configured to allow interaction with remote HMI and remote display devices via the network interface device 622.

The system 600 may be implemented using one or multiple computing systems. While the example depicts a single computing system 602 that implements all of the described features, it is intended that various features and functions may be separated and implemented by multiple computing units in communication with one another. The particular system architecture selected may depend on a variety of factors. In some embodiments, the system 600 may be configured to perform the systems and methods described herein, using the system 500 and/or various classical computing algorithms.

FIG. 7 generally illustrates computing environment 700 in accordance with one or more aspects of the present disclosure. Computing environment 700 may include computing system 602 which may be a server device, a network of servers, a client device, or any suitable computing device. The computing system 602 may execute the processes described herein on processor 604. The computing system 602 may further include a work order queue 706, a work order generator 708, a PACS interface 710, a payment and invoice generator 714, an account database 712, and a patient document database 716.

In some embodiments, the work order queue 706 stores all active work orders. Such work orders may include in complete work order drafts being generated by a requestor, a work order draft requiring a legal document awaiting engagement from a legal entity, a submitted work order awaiting image uploads to fulfill the work order, and work orders that have already been fulfilled. Different users may view the work order queue 706 differently based on their account type and the permissions granted to that account type. For example, a requestor may see all of the work order requests they created (or were created on their behalf) in the work order queue 706. The work order queue 706 may further include information related to the status of the work order, such as, awaiting patient authorization, awaiting legal authorization, awaiting action by health care entity, awaiting payment, awaiting authorization by patient's health care professional, and any other appropriate status. The work order queue 706 may further track status changes for work orders and update the work order based on the status changes.

In some embodiments the computing environment 700 may include work order generator 708 which creates work orders based on actions of users. For example, a first healthcare entity may generate a work order request for a patient's medical images. The work order generator 708 receives from the first health care entity all relevant details regarding the request, including patient details, ailment details, and any other relevant details. Work orders are generated and stored in work order queue 706.

In some embodiments the computing environment 700 may include a PACS Interface 710 for accessing medical images from external medical databases. The PACS interface 710 may be a client side software operating on a client device, a device used only to manage PACS transactions, a server side software in communication with a client device, or any suitable PACS communication set ups. The PACS interface 710 may facilitate the transaction of medical images, videos, and records. The work order generator 708 may access PACS interface 710 in order to determine which medical documents are available to request.

In some embodiments, the system may include payment and invoice generator 714. The payment and invoice generator 714 may communicate with work order queue 706 to determine which work orders require payment, what the payment amount is (based on the details of the work order), the status of the payment, and any other suitable financial related information. For example, when a first healthcare entity is creating a work order, the payment and invoice generator 714 may determine how many medical documents are being requested, types of documents being requested, involvement of $3^{rd}$ parties, and any other information relevant to determining payment. The payment and invoice generator 714 may further track the status of a payment request and alert the work order queue 706 when the payment is confirmed.

In some embodiments, the computing environment 700 may include account database 712 which stores the account information of all users. The account database 712 may include information related to the identities of the users, preferences of the users, the associations the user has with other users, the account type of the user, and any other relevant user information. The account database 712 may determine which records may be viewed and which actions may be taken by a user, based on their account information. For example, a medical professional at a first healthcare entity may be able to view records of patients assigned to them, where such information is available in the account database 712.

In some embodiments, the computing environment 700 may include a patient document database 716. The patient document database 716 may include documents uploaded by the user, such as authentication documents, billing documents, insurance documents, authorization documents, and the like. Patient document database 716 may further store copies of requested documents after they are received and may include medical documents, billing documents, legal documents, or any other requested document.

In some embodiments, the computing environment 700 may communicate with other computing devices over network 624. In some embodiments, such devices accessed over the network 624 may include patient client devices 722, healthcare entity clients 718, and legal entity clients 726. Healthcare entity clients 718 may include any computing devices operated by a healthcare entity such as desktop computers, laptop computers, smart phones, local servers, proxy servers, and the like. Patient clients 722 may include any computing devices used by a patient who is a user; such devices may include desktop computers, laptop computers, smart phones, local servers, proxy servers, and the like.

FIG. 8 illustrates process 800, an example process for initiating a document transfer, involving multiple parties, in accordance with some implementations of the present disclosure. The process 800 may be performed by processor 604 and communicate with external computing devices via the network 624. The process 800 may communicate with the network 624 via network interface device 622. Documents may be in any suitable format including .DOC, .DOCX, .HTM, .HTML, .ODT, .PDF, .RTF, .TXT, .WPS, .XML, .XPS, and any other suitable document format.

In S802, the process 800 receives from a first healthcare entity, at least one medical documents associated with a patient. In some embodiments, a medical document may include information identifying the patient. Such identifying information may include the patient name, the healthcare professional of the patient, the patient's date of birth, the patient's social security number, or any other suitable identifying information.

In S804, the process 800 receives from a second healthcare entity, a medical document request. In some embodiments, the medical document request may be directed to multiple documents or a single document. In some embodiments, a medical document may include an image, a report, financial document, a prescription, a referral, or any other relevant patient document.

In S806, the process 800 determines whether a legal document is required to approve the request. In some embodiments, the work order queue 706 may contain a record of each document request as it is generated. The work order queue 706 may further contain logic to determine whether a legal document is required for approval based on the information related to the document request. For example, information such as local legal requirements, applicable federal laws, what is the relationship of the party submitting the request, and any other relevant request information may be used to determine if a further legal document is required. In some embodiments, a legal document may include a document of authorization, a document of representation, a subpoena, or any other relevant legal document.

FIG. 9 is a flow chart of process 900 for authorizing a document transfer on behalf of a legal client, in accordance with some implementations of the present disclosure. The process 900 may be performed by processor 604 and communicate with external computing devices via the network 624. The process 900 may communicate with the network 624 via network interface device 622.

In S902, the process 900 sends a request to authenticate a medical document request associated with a patient to a legal entity. A legal entity may be a lawyer, paralegal, agent, or other suitable legal representative. The authentication request will further include information related to the request including patient name, patient healthcare professionals, medical document requested, legal document required, and any other relevant information. The legal entity will already be authorized as a legal representative of the patient. For example, legal authorization may be granted upon receipt and review of a signed document of representation. Such relationships and proof thereof may be stored in the account database 712. The legal entity may review the medical document request and the associated information to determine whether or not to grant the document request.

In S904, the process 900 receives from the legal entity a legal document responsive to the legal document request of the medical document request. The legal document request may be for a subpoena, a letter of authorization, a letter of representation, or any relevant legal document. Documents may be in any suitable format including .DOC, .DOCX, .HTM, .HTML, .ODT, .PDF, .RTF, .TXT, .WPS, .XML, .XPS, and any other suitable document format.

In S906, the process 900 has received from the legal entity a medical document that fulfills the legal document request. Approval of the legal document submitted by the legal entity may require review and approval by a human user. In S908, the process 900 determines that the response from the legal entity failed to approve the medical document request. In some embodiments, the failed authorization ends the medical document request.

In S910, the process 900 generates a work order associated with the medical document request in response to receiving a legal document fulfilling the legal document request. The work order may be generated by work order generator 708. The work order is the made accessible by the work order queue 706. In S912, the process 900 sends a notification to the first health care entity (which initiated the medical document request) which includes the completed work order. In some embodiments, the completed document request may include relevant information related to the medical document request.

FIG. 10 is a flow chart of process 1000 for completing the transfer of an authorized document, in accordance with some implementations of the present disclosure. The process 1000 may be performed by processor 604 and communicate with external computing devices via the network 624. The process 1000 may communicate with the network 624 via network interface device 622.

In S1002, the process 1000 receives, from a first healthcare entity, at least one medical document associated with a patient at the computing system 602. In some embodiments, the computing system 602 may be an onsite computing device or an offsite proxy server connected to the network 624. In some embodiments, a medical document may include information identifying the patient. Such identifying information may include the patient name, the healthcare professional of the patient, the patient's date of birth, the patient's social security number, or any other suitable identifying information.

In S1004, the process 1000 receives a medical document request from a second healthcare entity. In some embodiments the medical document request is directed to the first healthcare entity after determining that the medical document they require has been received by the first healthcare entity. In some embodiments, a user generating a medical document request may receive some information related to the medical document through the computing system 602, from the first healthcare entity. A healthcare professional associated with the first health care entity may provide the access to information related to a medical document by selecting available documents related to the medical document request and sending them to the user. The user may then select which of the available documents they wish to receive based on the information related to the medical document request. Information related to a medical document may include medical document metadata, requesting healthcare professional, date of document creation, name of patient, area of affliction, date of affliction, or any other relevant information.

In S1006, the process 1000 generates a work order to fulfill the request, after the request is authenticated. In some embodiments, authentication of the work order requires input from the patient, the health care professional associated with the patient, the legal entity associated with the patient, the legal guardian of the patient, and any other suitable party. In some embodiments, the work order may be accessible from the work order queue 706. In some embodiments, the creation and management of the work order is handled by work order generator 708. In some embodiments, the documents may be encrypted before they are communicated; the documents are decrypted at a computing device of their destination.

In S1008, the process 1000 receives, in response to the work order, the medical document from the first health care entity. In some embodiments, the work order is received and viewed from the work order queue 706, which includes access to information related to the work order. In some embodiments, the medical document may include medical imaging (e.g., X-rays, computed tomography (CT) scans, magnetic resonance imaging (MRI), ultrasound, positron-emission tomography (PET) scan), medical reports (e.g., history and physical report, consultation report, operative report, radiology report, pathology report, laboratory report, hospital report, discharge summary, and office reports), patient financial documents (e.g., bills, receipts, insurance), patient referrals, patient prescriptions, and any other relevant medical documents.

In S1010, the process 1000 may send requested medical document to the second healthcare entity. The document may be sent/received via the PACS system 316 (picture archiving and communication system). In some embodiments, the PACS system 316 is a medical imaging platform which provides storage and access to patient documents from multiple client devices. Patient files stored by PACS are stored in a format called DICOM (digital imaging and communications in medicine). The overarching administrative tool used to manage that facilitates the intercommunication of these services is the HIS/RIS 318, (hospital information system/radiology information system). In some embodiments, the requested medical document may be in a DICOM format and viewable from computing system 602 and a client device of the second health care entity. In some embodiments, DICOM files are encrypted before being communicated and are decrypted at the computing system 602 or the servers of the healthcare entities receiving the DICOM file.

FIG. 11 is an example representation of user interface 1100 for initiating a document transfer request, in accordance with some implementations of the present disclosure. In some embodiments, the user interface 1100 may include a patient details section 1102, a work order details 1104, a document request type 1106, and an attachments section 1108. In some embodiments, the user interface 1100 may include patient details section 1102 which may include text fields that may be filled with input by a user. User input fields for patient details may include, but are not limited to, last name, first name, aka first name, aka last name, date of birth, and social security numbers.

In some embodiments, the user interface 1100 further includes a work order details section 1104. The work order details section 1104 may include input fields for information related to the work order. In some embodiments, the information related to the work order may include type, claim number, work order number, date of affliction, area of affliction, custodian, date from, and date to. The work order number may be a uniquely generated number associated with a work order for the purpose of identification and easy retrieval.

In some embodiments, the user interface 1100 may include a document request section 1106. In some embodiments, the document request section 1106 may include check boxes next to each option, those options include images, patient's bill, prescription/referral/Rx, and radiology report. Multiple items may be selected as part of the same medical document request.

In some embodiments, the user interface 1100 may include documents as part of the work order being generated uploaded at attachments section 1108. For example, documents may be stored locally on a client machine being operated by the user, selection of the "Add Attachment" button will allow the user to access their local storage and select a local document. After a selection is made, the file name and attachment type populate the attachment section 1108.

FIG. 12 is an example representation of user interface 1200 for following up on a document transfer request, in accordance with some implementations of the present disclosure. In some embodiments, the requested document upload user interface 1200 may be accessed from work order queue 706. The user interface 1200 may be displayed to a user of a computing device such as a health care entity client 418. The user interface 1200 may be executed by processor 604 and displayed on display 632.

In some embodiments, the user interface 1200 may include document request information section 1202, uploader document statement selection section 1204, file upload list 1206, and document upload section 1208. In some embodiments, the document request information section 1202 may include patient name, claim number, work order number, date of affliction, record retrieval type, and date range requested. The date range requested includes in the medical document request refers to all documents matching the parameters of the request over the time period indicated by the date range requested.

In some embodiments, the user interface 1200 may include uploader document statement selection section 1204. A user uploading documents may select one of the three available options, a first option indicating the user is delivering all the requested documents, a second options indicating the user is excluding one or more of the requested documents without explanation, and a third options indicating the user is excluding one or more of the requested documents with explanation of why. In some embodiments, the uploader document statement selection section 1204 may further include a dynamic text box that allows input from the user based on the selection they make. For example, when the user selects the second options, only the section allowing for a listing of excluded items becomes active. Instead, when the user selects the third option, the dynamic text box allows for inputs in the field allowing input of the excluded documents and also a field allowing input of the reasoning for each exclusion.

In some embodiments, the user interface 1200 may include a document upload section 1208 which may facilitate the uploading of documents. In some embodiments a user may select an upload document button and allowed to select a document on their local client memory to upload. Files selected for upload may be added to the upload new document list.

FIG. 13 is an example representation of user interface 1300 for viewing an invoice related to a document transfer request, in accordance with some implementations of the present disclosure. In some embodiments, after a work order is generated and approved by all relevant parties and to fulfill the work order a user may receive delivery of the requested medical documents. In some embodiments, payment may be required before the medical documents can be delivered. The payment required may be automatically generated based on the information related to the work order. Information relevant to generating a payment amount may include number of documents requested, the types of documents requested, the number of image files in the documents, number of parties involved in the approval process, and any other relevant information to determining payment.

In some embodiments the user interface 1300 may include the document request information section 1302. The document request information section 1302 may include patient name, claim number, work order number, date of affliction, record retrieval type, and date range requested. The date range requested includes in the medical document request refers to all documents matching the parameters of the request over the time period indicated by the date range requested.

In some embodiments, the user interface 1300 may include an itemized billing section 1304. The itemized billing section 1304 may include a breakdown of the components of the total payment calculated. In some embodiments, the component parts include reports, images, processing fee, search fee, merchant fee, and any applicable payment information. In some embodiments, the user interface 1300 may further include payment selection section 1306. Payment selection section 1306 may offer payment options already confirmed by the user. Pre-approved payment options are each presented with a selection bubble. Once an appropriate payment options is selected, the "Pay For This Entry" button will activate, and its selection will execute the payment. Once payment is received, the requested medical documents are sent to the user and the work order is fulfilled.

In some embodiments, payment option approval may require input by the user of certain information or documents related to the payment option. For example, a user may be required to send in pictures of their identification card, their credit card, and any other payment related information. Payment may be authorized by any appropriate method, including answering questions regarding small deposits in the account, communication with the related financial entity.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in that particular order discussed or illustrated, unless specifically identified as an order of performance. It is also to be understood that additional or alternative steps may be employed.

Clauses

Clause 1. A method for managing a document request, the method comprising:
receiving, from a first healthcare entity, at least one medical document associated with a patient at a server;
receiving, from a second healthcare entity, a medical document request where the medical document request may be directed to one of an image, a financial statement, a prescription, a referral to healthcare entity, or a report;
determining, based on the document request, whether a legal document is required to approve the request; and
sending, in response to the request requiring approval from a legal entity, to a legal entity associated with the patient a legal document request related to the medical document request.

Clause 2. The method of any clause herein, further comprising:
receiving, from the legal entity, a legal document associated with the legal document request;
generating, in response to the legal document fulfilling the legal document request, a work order associated with the medical document request; and
sending the work order to the first healthcare entity.

Clause 3. The method of any clause herein, further comprising:
receiving, from the first healthcare entity, in response to the work order, the medical document; and
sending, to the second healthcare entity, the medical document and the legal document.

Clause 4. The method of any clause herein, wherein a payment associated with the work order is calculated based on the number of medical documents requested and a type of medical documents requested.

Clause 5. The method of any clause herein, wherein a medical document request may further include a date of ailment and a location of ailment.

Clause 6. The method of any clause herein, wherein a legal staff associated with the legal entity may respond to legal document requests.

Clause 7. The method of any clause herein, wherein a legal document is one of an authorization document, a letter of representation document, and a subpoena document.

Clause 8. The method of any clause herein, wherein the legal entity is authorized by the patient, where authorization occurs when an authorization document citing the legal entity is signed by the patient and received by the server.

Clause 9. The method of any clause herein, wherein the document request further comprises a name of a patient and a patient identification information, a request type, a request unique identifier, a patient insurance claim identifier, and a healthcare professional associated with the patient.

Clause 10. A non-transitory computer-readable storage medium encoded with computer-executable instructions, that when executed by a device, cause a processor to:
receive, from a first healthcare entity, at least one medical document associated with a patient at a server;
receive, from a second healthcare entity, a medical document request where the medical document request may be directed to one of an image, a financial statement, a prescription, a referral to healthcare entity, or a report;

determine, based on the document request, whether a legal document is required to approve the request; and
send, in response to the request requiring approval from a legal entity, to a legal entity associated with the patient a legal document request related to the medical document request.

Clause 11. The non-transitory computer-readable storage medium of any clause herein, where the computer-executable instructions further cause the processor to:
receive, from the legal entity, a legal document associated with the legal document request;
generate, in response to the legal document fulfilling the legal document request, a work order associated with the medical document request; and
send the work order to the first healthcare entity.

Clause 12. The non-transitory computer-readable storage medium of any clause herein, where the computer-executable instructions further cause the processor to:
receiving, from the first healthcare entity, in response to the work order, the medical document; and
sending, to the second healthcare entity, the medical document and the legal document.

Clause 13. The non-transitory computer-readable storage medium of any clause herein, wherein a payment associated with the work order is calculated based on the number of medical documents requested and a type of medical documents requested.

Clause 14. The non-transitory computer-readable storage medium of any clause herein, wherein a legal document may be one of an authorization document, a letter of representation document, and a subpoena document.

Clause 15. The non-transitory computer-readable storage medium of any clause herein, wherein the legal entity is authorized by the patient, where authorization occurs when an authorization document citing the legal entity is signed by the patient and received by the server.

Clause 16. A device having a processor and a non-transitory computer-readable medium encoded with instructions that, when executed by the processor, cause the processor to:
receive, from a first healthcare entity, at least one medical document associated with a patient at a server;
receive, from a second healthcare entity, a medical document request where the medical document request may be directed to one of an image, a financial statement, a prescription, a referral to healthcare entity, or a report;
determine, based on the document request, whether a legal document is required to approve the request; and
send, in response to the request requiring approval from a legal entity, to a legal entity associated with the patient a legal document request related to the medical document request.

Clause 17. The device of any clause herein, where the computer-executable instructions further cause the processor to:
receive, from the legal entity, a legal document associated with the legal document request;
generate, in response to the legal document fulfilling the legal document request, a work order associated with the medical document request; and
send the work order to the first healthcare entity.

Clause 18. The device of any clause herein, where the computer-executable instructions further cause the processor to:
receive, from the first healthcare entity, in response to the work order, the medical document; and
send, to the second healthcare entity, the medical document and the legal document.

Clause 19. The device of any clause herein, wherein a payment associated with the work order is calculated based on the number of medical documents requested and the type of medical documents requested.

Clause 20. The device of any clause herein, wherein the legal entity is authorized by the patient, where authorization occurs when an authorization document citing the legal entity is signed by the patient and received by the server.

When an element or layer is referred to as being "on," "engaged to," "connected to," or "coupled to" another element or layer, it may be directly on, engaged, connected or coupled to the other element or later, or intervening element or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to described various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

What is claimed is:

1. A method for managing a document request, the method comprising:
generating, by a first healthcare entity, a medical document associated with a patient;
storing, by a picture archiving and communication system (PACS) associated with the first healthcare entity, the medical document in a digital imaging and communications in medicine (DICOM) format;
receiving a medical document request to transmit the medical document to a second healthcare entity, wherein the medical document request includes at least one of a C-move command and a C-find command;
determining, based on the medical document request, whether a legal document is required approve the medical document request;
sending, in response to determining that the legal document is required to approve the medical document request, a legal document request to a legal entity associated with, and authorized as a legal representative of, the patient;
receiving a legal document responsive to the legal document request;
determining that the legal document responsive to the legal document request fulfills the legal document request;
receiving, from the first healthcare entity, the medical document; and
sending, using a C-move command, the medical document to the second healthcare entity.

2. The method of claim 1, further comprising:
generating, in response to the legal document fulfilling the legal document request, a work order associated with the medical document request.

3. The method of claim 2, further comprising: sending the work order to the first healthcare entity.

4. The method of claim 2, further including: calculating a payment associated with the work order based on a number of medical documents requested and a type of medical documents requested.

5. The method of claim 1, wherein the medical document request further includes a date of ailment and a location of ailment.

6. The method of claim 1, wherein the legal document includes one of an authorization document, a letter of representation document, and a subpoena document.

7. The method of claim 1, wherein the medical document request further comprises a name of a patient and a patient identification information, a request type, a request unique identifier, a patient insurance claim identifier, and a healthcare professional associated with the patient.

8. The method of claim 1, wherein the medical document includes an image generated by a scanning modality.

9. The method of claim 1, further including:
receiving, at a client computing device, a set of instructions;
instantiating, using the set of instructions, a client-side gateway configured to provide secure connection between the client computing device and a remote computing device; and generating, by the remote computing device, a unique identification value for the client computing device based on at least one property of the client computing device.

10. The method of claim 9, wherein the set of instructions installs a data object on the client computing device which is configured to facilitate communications between the client computing device and the remote computing device.

11. A computing system comprising:
a processor; and
a non-transitory computer-readable storage medium encoded with computer-executable instructions, that when executed, cause the processor to:
access a picture archiving and communication system (PACS) associated with a first healthcare entity, storing a medical document associated with a patient and in a digital imaging and communications in medicine (DICOM) format;
receive a medical document request to transmit the medical document to a second healthcare entity, wherein the medical document request includes at least one of a C-move command and a C-find command;
determine, based on the medical document request, whether a legal document is required approve the medical document request;
send, in response to determining that the legal document is required to approve the medical document request, a legal document request to a legal entity associated with , and authorized as a legal representative of, the patient;
receive a legal document responsive to the legal document request;
determine that the legal document responsive to the legal document request fulfills the legal document request;
receive, from the first healthcare entity, the medical document; and
send, using a C-move command, the medical document to the second healthcare entity.

12. The computing system of claim 11, wherein the computer-executable instructions further cause the processor to:
generate, in response to the legal document fulfilling the legal document request, a work order associated with the medical document request.

13. The computing system of claim 12, wherein the computer-executable instructions further cause the processor to: send the work order to the first healthcare entity.

14. The computing system of claim 12, wherein the computer-executable instructions further cause the processor to: calculate a payment associated with the work order and based on a number of medical documents requested and a type of medical documents requested.

15. The computing system of claim 11, wherein the medical document request further includes a date of ailment and a location of ailment.

16. The computing system of claim 11, wherein the legal document includes one of an authorization document, a letter of representation document, and a subpoena document.

17. The computing system of claim 11, wherein the medical document request further comprises a name of a patient and a patient identification information, a request type, a request unique identifier, a patient insurance claim identifier, and a healthcare professional associated with the patient.

18. The computing system of claim 11, wherein the medical document includes an image generated by a scanning modality.

19. The computing system of claim 11, wherein the computer-executable instructions further cause the processor to:
- receiving, at a client computing device, a set of instructions;
- instantiating, using the set of instructions, a client-side gateway configured to provide secure connection between the client computing device and a remote computing device; and
- generating, by the remote computing device, a unique identification value for the client computing device based on at least one property of the client computing device.

20. The computing system of claim 19, wherein the set of instructions installs a data object on the client computing device which is configured to facilitate communications between the client computing device and the remote computing device.

* * * * *